S. L. HAGAN.
REGISTER FOR CAMERAS.
APPLICATION FILED APR. 23, 1920.
1,389,827.
Patented Sept. 6, 1921.
2 SHEETS—SHEET 1.
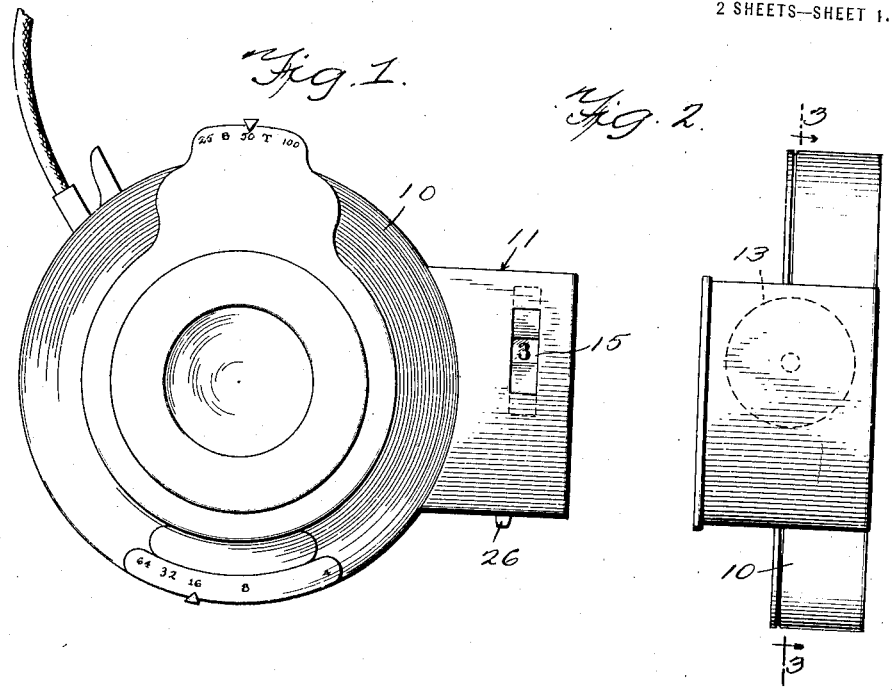
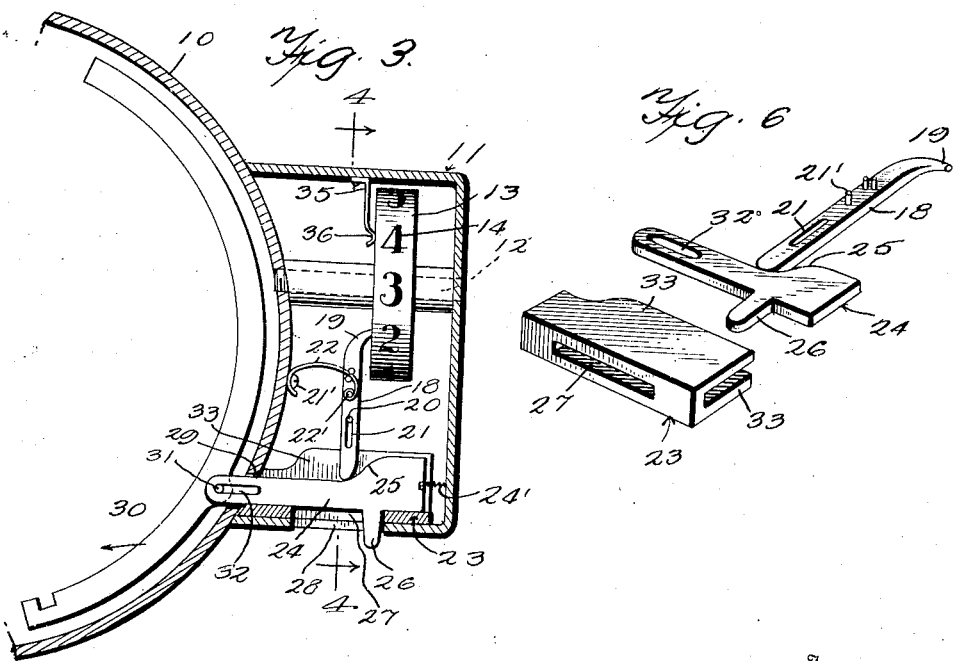
Inventor
Stanley L. Hagan, S. L. HAGAN.
REGISTER FOR CAMERAS.
APPLICATION FILED APR. 23, 1920.
1,389,827.
Patented Sept. 6, 1921.
2 SHEETS—SHEET 2.
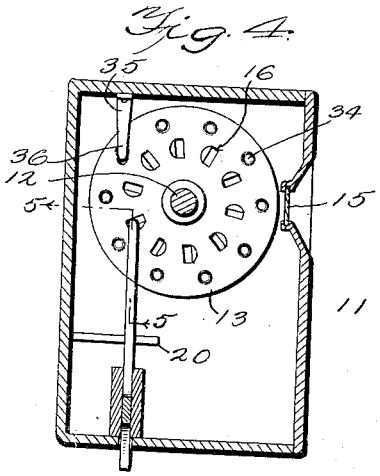
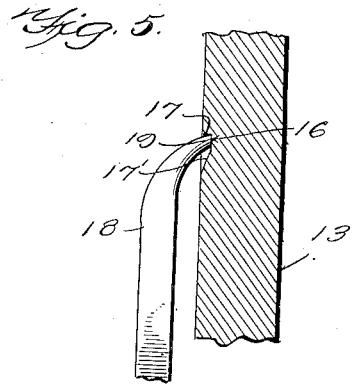
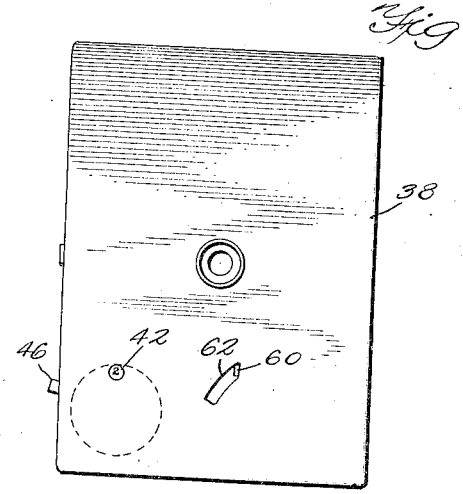
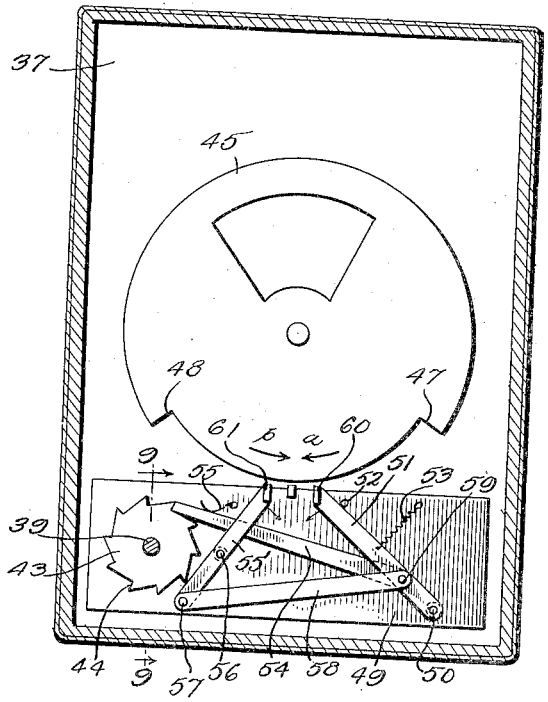
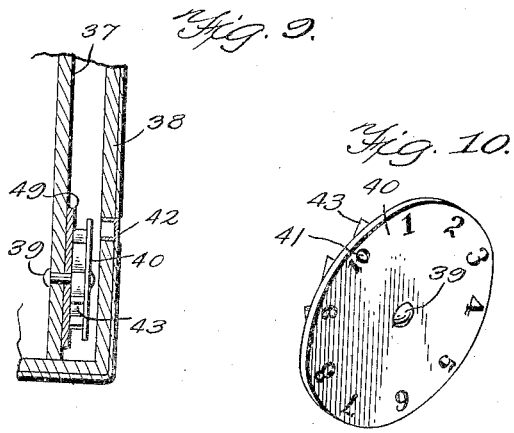
Inventor
Stanley L. Hagan,
By
Attorney

UNITED STATES PATENT OFFICE.

STANLEY LORING HAGAN, OF BUTTE, MONTANA.

REGISTER FOR CAMERAS.

1,389,827.  Specification of Letters Patent.  Patented Sept. 6, 1921.

Application filed April 23, 1920. Serial No. 376,114.

*To all whom it may concern:*

Be it known that I, STANLEY L. HAGAN, a citizen of the United States, residing at Butte, in the county of Silver Bow and State of Montana, have invented certain new and useful Improvements in Registers for Cameras, of which the following is a specification.

This invention relates to improvements in exposure meters for cameras.

An important object of the invention is to provide means whereby the operator of an ordinary film camera or magazine plate camera may, without doubt, properly arrange the film or plate so as to present an unexposed section for use. Photographers, particularly the amateur photographer, often experience difficulty in remembering whether or not the film or plate was changed after the last exposure was made. Lapses of memory are the cause of both double exposures and unexposed plates or sections of films, both of which result in pecuniary loss to the photographer, in addition to the probable irreparable loss of two photographs in the case of double exposure. In order to eliminate the memory factor in handling of the camera, I have provided an attachment for cameras, whereby a meter is actuated by the shutter of the camera. This meter is independent of any control by the film and merely shows after each exposure which number of film or plate should be in position for the next exposure.

Other objects and advantages of the invention will be apparent during the course of the following description.

In the accompanying drawings forming a part of this specification and in which like numerals designate like parts throughout the same, Figure 1 is a front elevation of a camera of the kodak type, showing my invention applied to the shutter - containing casing thereof.

Fig. 2 is a side elevation thereof,

Fig. 3 is a section taken on line 3—3 of Fig. 2,

Fig. 4 is a section taken on line 4—4 of Fig. 3,

Fig. 5 is a section taken on line 5—5 of Fig. 4,

Fig. 6 is a combined detail perspective of the actuating mechanism for the indicator, Fig. 7 is a front elevation of a camera of the box type, showing my invention applied thereto, Fig. 8 is a similar view somewhat enlarged, the false front of the camera being removed, Fig. 9 is an enlarged sectional view showing the indicator wheel and the mounting thereof, and, Fig. 10 is a perspective of the indicator wheel detached.

In the drawings, wherein for the purpose of illustration is shown preferred embodiments of my invention, attention being first called to Figs. 1 to 6 inclusive, the numeral 10 designates that portion of a kodak type of camera which contains the shutter, embodying an external casing. Secured to this casing is a casing 11 containing the indicator. Mounted in the casing 11 and in the casing of the shutter containing casing 10 is a shaft 12, having rotatably mounted thereon an indicia bearing wheel 13, provided upon its periphery with indicia corresponding in number to the number of exposures contained in the film roll pack or plate pack with which the camera is adapted to be loaded, this number being shown in the present instance as 10. The casing 11 is provided with a window 15, adjacent the periphery of the wheel 13, through which the indicia 14 are visible.

The wheel 13 is provided in one side thereof with a circular row of notches 16, corresponding in number and arrangement to the indicia on the periphery of the wheel. The forward edges 17 of the notches 16 or the edges thereof forwardly disposed as regards the direction of rotation of the wheel, are provided with an abrupt shoulder 17, and the rear edges thereof are provided with an inclined face 17'. An operating lever 18 is provided having a nose 19, adapted to engage in the notches 16 against the shoulder 17 thereof.

The lower end of the operating lever 18 is mounted upon a pin 20, the pin operating in a slot 21, formed in the lever. A spring 22 is secured to the casing 10, as at 21', and to the lever 18, as at 22'. This spring is so constructed as to cause the lever 18 to move downwardly and at the same time to hold the nose 19 of the lever in firm engagement with the wheel 13, and the notches 16 thereof, as clearly shown in Fig. 3.

Mounted in the lower end of the casing 11 is a guide member 23. Slidably mounted in the guide member 23 is a shifter 24 embodying a cam face 25 against which the lower end of the lever 18 is adapted to contact. The shifter 24 is likewise provided with an extension 26, extending through an opening 27 formed in the guide 23, and a similar opening 28 formed in the casing 11, the extension 26 being of sufficient length to project without the casing for engagement by the finger.

The numeral 30 designates a member preferably forming a normal part of the shutter operating mechanism of the camera which is adapted to be shifted in the direction of the arrow in Fig. 3 when the shutter is operated to expose the film. The shifter 24 has its inner end extending through an opening 29, formed in the wall of the casing 10 and secured to the member 30, as by means of pin 31. This member may be either secured against movement with relation to the shifter 24 or the shifter 24 may be provided with a slot 32, the purpose of which will presently appear. The guide 23 is provided with side walls 33, within which the lower end of the lever 18 extends and within which the shifter 24 is adapted to operate. The wheel 13 is provided with an additional annular row of depressions 34, corresponding in number and arrangement to the indicia upon its annular face. A spring 35 is secured to the wall of the casing 11, has its end 36 engaging the side of the wheel 13, and adapted to enter the depressions 34. This spring prevents overrunning of the indicia and too rapid movement of the wheel 13.

The operation of this form of my device is as follows:

When the film or plates are loaded in the camera, the indicia wheel is so adjusted that the numeral which appears in the window 15, thus indicating that the adjustment which governs the shifting of the film or plates should be shifted until the numeral 1 appears in the indicia window therefor. If the shutter is now actuated, the member 30 moving in the direction of the arrow shifts the shifter 24, and raises the lever 18 by virtue of the cam face 25, moving the indicia wheel one step and bringing the numeral 2 into alinement with the window 15, thus indicating that the film or plate should be changed until the numeral 2 appears in the indicator therefor.

In event it is desired to set the indicator wheel 13 independently of actuation by the shutter, this may be done by manipulating the extension 26, the spring 24' returning the shifter 24 to normal position after each actuation whether by means of extension 26 or other medium of the member 30.

In Figs. 7 to 10 inclusive, I have illustrated a means through which my device may be applied to cameras of the type known as box cameras. In this form of camera, the true front 37 of the camera is generally covered by a false front 38 which is spaced therefrom.

The indicia bearing wheel 40 is pivotally mounted, as at 39 upon the front 37 of the camera and lies between the front 37 and the false front 38. This wheel is provided upon the face adjacent the wall 38 with a row of indicia 41, adapted to be positioned to a window 42 formed in the wall 38. To the rear face of the indicia wheel 40 is secured a ratchet 43, the teeth 44 of which correspond in number and arrangement to the indicia upon the face of the wheel.

In this form of camera, the shutter 45 is generally actuated by a lever 46 and the exposure is made each time the lever is moved, one as the lever is moved down and the other as the lever is returned to normal position and the shutter 45 accordingly moves in both directions.

In applying my invention to this form of camera, the shutter 45 is provided with a recess in its peripheral edge, forming shoulders 47 and 48.

Pivotally mounted upon the front 37 or upon a plate 49 attached thereto, as at 50, is a lever 51, the pivot of the lever lying at the lower end thereof. The lever is maintained in the position shown in Fig. 8 by means of stop 52, and spring 53. A lever 54 is provided, pivotally connected at its end to the lever 51, intermediate the ends thereof. The free end of this lever engages the teeth 44 of the ratchet 43 and is held in such engaged position by any suitable means, such as spring 55. A second lever 55' is pivoted intermediate its ends as at 56, to the plate 49. To the lower end of this lever, as at 57, is pivotally connected a link 58, having its opposite end connected with the lever 51 intermediate its ends, as at 59. The free ends of the levers 51 and 55' are disposed adjacent the peripheral edge of the shutter 45 formed by the recess which forms the shoulders 47 and 48.

The operation of this form of my device is as follows:

If the shutter is shifted in the direction of the arrow designated as $a$ in Fig. 8, the shoulder 47 comes in contact with an extension 60, formed on the free end of the lever 51, moving this end of the lever to the left and causing the lever 54 to shift the ratchet wheel and indicator wheel one step. When the shutter is again actuated, it moves in the direction of the arrow designated as $b$ releasing the lever 51, to be drawn back by the spring 53 to engage the stop 52 and place the end of the lever 54 in engagement with the next notch of the ratchet 43. Immediately thereafter, the shoulder 48 comes in contact with the extension formed on the free end of the lever 55' and causes this lever to move in the direction of the arrow leading therefrom, in Fig. 8. This shift of the lever in this direction causes the lever 54 to be actuated through the medium of link 58 and lever 51, again shifting the ratchet one notch. When the shutter is again actuated, the spring returns the levers to the normal position, as before stated, and the extension 60 is again engaged by the shoulder 47. In event it is desired to actuate the indicator wheel 40 independently of the shutter 45, a notch 62 may be formed in the false front 38 and one of the extensions 60 or 61 may be of sufficient length to extend therethrough for engagemeent by the finger.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. In a register for cameras, embodying a shutter casing, a casing adapted to be secured to the shutter casing, a horizontal shaft mounted in said casing, an indicia bearing wheel rotatably mounted upon said shaft and provided in one side thereof with notches, a vertically disposed lever having at its upper end a nose adapted to engage the notches of said wheel, said lever being adapted to be shifted to raised and lowered positions, a spring holding said lever in engagement with said wheel and in lowered position, a shifter slidably mounted within said casing and having one end extending through the wall of said shutter casing, the end of said shifter being loosely connected with a movable part of the shutter to be shifted in one direction thereby, means for returning said shifter to normal position, and a cam face formed on said shifter adapted to engage the lower end of said lever and elevate the same.

2. The combination with the shutter of a camera including a casing and a movable element, of a register casing secured to said shutter casing and provided with a window, an indicia bearing wheel rotatably mounted in said register casing, the indicia on said wheel being adapted to successively register with said window, said wheel being provided with a series of circularly arranged ratchet notches arranged in one face thereof, an operating lever having its inner end engaging said notches, and a shifter slidably mounted in said casing and having connection with the movable element of the shutter, said shifter being provided with a cam face adapted to contact the outer end of said operating lever.

3. The combination with the shutter of a camera including a casing and a movable element, of a register casing secured to said shutter casing and provided with a window, a shaft having one end mounted in each of said casings, an indicia bearing wheel rotatably mounted on said shaft, the indicia on said wheel being adapted to successively register with said window, said wheel being provided with a series of circularly arranged ratchet notches and a series of circularly arranged stop notches arranged in one face of the wheel, an operating lever having its inner end engaging said ratchet notches, said lever being provided with a slot, a pin carried by said register casing and engaging within said slot, a substantially U-shaped guide member, a shifter slidably mounted in said guide member and having connection with the movable element of the shutter, said shifter being provided with a cam face, the outer end of the said operating member being disposed within said guide, and contacting said cam face, and a resilient member carried by said register casing and having its inner end engaging said stop notches at one limit of movement of said operating member.

4. The combination with the shutter of a camera including a casing and a movable element, of a register casing secured to said element, of a register casing and provided with a window, shutter casing and provided with a window, an indicia bearing wheel rotatably mounted in said casing, the indicia on said wheel being adapted to successively register with said window, said wheel being provided with a series of circularly arranged ratchet notches arranged in one face thereof, an operating lever having its inner end engaging said ratchet notches, said operating lever being provided with a slot intermediate its end, a pin carried by said register casing and engaging within said slot, a shifter slidably mounted in said register casing and having connection with the movable element of the shutter, said shifter being provided with a cam face contacting with the outer end of said operating lever, and a spring having one end connected with said shutter casing and its opposite end connected with said operating lever intermediate said slot and the inner end of the lever for normally projecting said operating lever outwardly and downwardly.

5. The combination with the shutter of a camera including a casing and a movable element, of a rotatbly mounted indicia bearing wheel provided with ratchet teeth, an operating lever having its inner end engaging said ratchet teeth, and a slidably mounted shifter contacting with the movable element of the shutter, said shifter being provided with a cam face adapted to contact the outer end of said operating lever.

In testimony whereof I affix my signature in presence of two witnesses.

STANLEY LORING HAGAN.

Witnesses:
S. L. HAGAN,
KATHRYN NOONAN.